United States Patent
Cannon et al.

(10) Patent No.: US 10,102,466 B2
(45) Date of Patent: Oct. 16, 2018

(54) MAGNETIC KEYS HAVING A PLURALITY OF MAGNET LAYERS WITH HOLES

(71) Applicant: Lexmark International, Inc., Lexington, KY (US)

(72) Inventors: Roger Steven Cannon, Nicholasville, KY (US); Gary Allen Denton, Lexington, KY (US); Graydon Randall Dodson, Lexington, KY (US); Keith Bryan Hardin, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 15/378,917

(22) Filed: Dec. 14, 2016

(65) Prior Publication Data
US 2018/0165558 A1    Jun. 14, 2018

Related U.S. Application Data

(63) Continuation-in-part of application No. 15/373,967, filed on Dec. 9, 2016.

(51) Int. Cl.
*G03G 15/00* (2006.01)
*G06K 19/06* (2006.01)
*G06K 7/08* (2006.01)

(52) U.S. Cl.
CPC ....... *G06K 19/06187* (2013.01); *G06K 7/087* (2013.01)

(58) Field of Classification Search
CPC .......................... G06K 19/06187; G06K 7/087
See application file for complete search history.

(56) References Cited

U.S. PATENT DOCUMENTS

| 5,451,759 | A | 9/1995 | Hoshino |
| 5,981,053 | A | 11/1999 | Naylor |
| 7,005,733 | B2* | 2/2006 | Kommerling ........... G06F 21/86 257/679 |
| 7,865,722 | B2 | 1/2011 | Moran |
| 9,454,125 | B1 | 9/2016 | Bejat et al. |
| 9,665,748 | B1* | 5/2017 | Ahne ..................... G06Q 10/00 |
| 2002/0021909 | A1 | 2/2002 | Harumoto |
| 2003/0059050 | A1 | 3/2003 | Hohberger |
| 2005/0017082 | A1 | 1/2005 | Moran |
| 2005/0111342 | A1 | 5/2005 | Wisnudel |
| 2005/0116307 | A1* | 6/2005 | De Jongh ........ G06K 19/07372 257/414 |

(Continued)

OTHER PUBLICATIONS

Non-final Office Action dated Apr. 21, 2017; U.S. Appl. No. 15/440,590.

(Continued)

*Primary Examiner* — David M Gray
*Assistant Examiner* — Michael Harrison

(57) ABSTRACT

Magnetic keys having a plurality of magnetic layers having holes are disclosed. The location and orientation of the holes are controlled to generate magnetic fields that are of sufficient strength to be reliably read and sufficient complexity to be difficult to counterfeit. The magnetic keys are located on imaging-device supply items along with non-volatile memory devices containing measurements of the magnetic fields that are digitally signed. These supply items are difficult to counterfeit. Other devices are disclosed.

20 Claims, 10 Drawing Sheets

(56) References Cited

U.S. PATENT DOCUMENTS

| | | |
|---|---|---|
| 2006/0056021 A1 | 3/2006 | Yeo |
| 2007/0199991 A1 | 8/2007 | Haraszti |
| 2007/0222604 A1 | 9/2007 | Phipps |
| 2008/0052518 A1 | 2/2008 | Newton |
| 2009/0061226 A1 | 3/2009 | Banin |
| 2010/0038598 A1 | 2/2010 | Bastiaansen |
| 2010/0061772 A1 | 3/2010 | Hayashi |
| 2010/0196056 A1 | 8/2010 | Ohkawa et al. |
| 2010/0215406 A1 | 8/2010 | Ozawa |
| 2011/0038649 A1 | 2/2011 | Miyabe |
| 2011/0099117 A1 | 4/2011 | Schepers |
| 2012/0163872 A1 | 6/2012 | Hayashi et al. |
| 2013/0029112 A1 | 1/2013 | Bargin |
| 2014/0270857 A1 | 9/2014 | Harpur |
| 2015/0071432 A1* | 3/2015 | Zhu .................... G11C 11/1673 380/28 |
| 2016/0105220 A1 | 4/2016 | Kim et al. |
| 2016/0245878 A1 | 8/2016 | Hwang et al. |

OTHER PUBLICATIONS

Amendment entered Jul. 19, 2017; U.S. Appl. No. 15/440,590.
Final Office Action dated Sep. 11, 2017; U.S. Appl. No. 15/440,590.
International Search Report dated Jan. 6, 2017 PCT/US16/63832.
International Written Opinion dated Jan. 6, 2017 PCT/US16/63832.
International Search Report dated Jan. 23, 2017; PCT/US16/61063.
International Written Report dated Jan. 23, 2017; PCT/US16/61063.
Non-final office action dated Jun. 22, 2016; U.S. Appl. No. 14/879,335.
Mon-final office action dated Jun. 17, 2016; U.S. Appl. No. 14/879,344.
International Search Report; PCT/US2017/064427 dated Feb. 21, 2018.
Written Opinion of the International Search Authority; PCT/US2017/064427 dated Feb. 21, 2018.

* cited by examiner

MAGNETIC KEYS HAVING A PLURALITY OF MAGNET LAYERS WITH HOLES

CROSS REFERENCES TO RELATED APPLICATIONS

This application is a continuation-in-part of application Ser. No. 15/373,967 filed Dec. 9, 2016 titled MAGNETIC KEYS HAVING A PLURALITY OF MAGNETIC PLATES.

BACKGROUND

1. Field of the Disclosure

The present disclosure relates generally to anti-counterfeit systems and more particularly to magnetic keys on supply items.

2. Description of the Related Art

Counterfeit printer supplies, such as toner bottles, are a problem for consumers. Counterfeit supplies may perform poorly and may damage printers. Printer manufacturers use authentication systems to deter counterfeiters. Physical unclonable functions (PUF) are a type of authentication system that implements a physical one-way function. Ideally, a PUF cannot be identically replicated and thus is difficult to counterfeit. Thus, it is advantageous to maximize the difficulty of replicating a PUP to deter counterfeiters.

PUFs have been proposed that contain random distributions of magnetic particles in a non-magnetic substrate. Since the distribution is random, it is difficult to ensure that the generated magnetic field will have sufficient strength to be reliably read by low-cost magnetic field sensors. Also, it is difficult to ensure that the generated magnetic field will be sufficiently complex to be difficult to counterfeit. What is needed is a magnetic key that overcomes these deficiencies.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION in the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
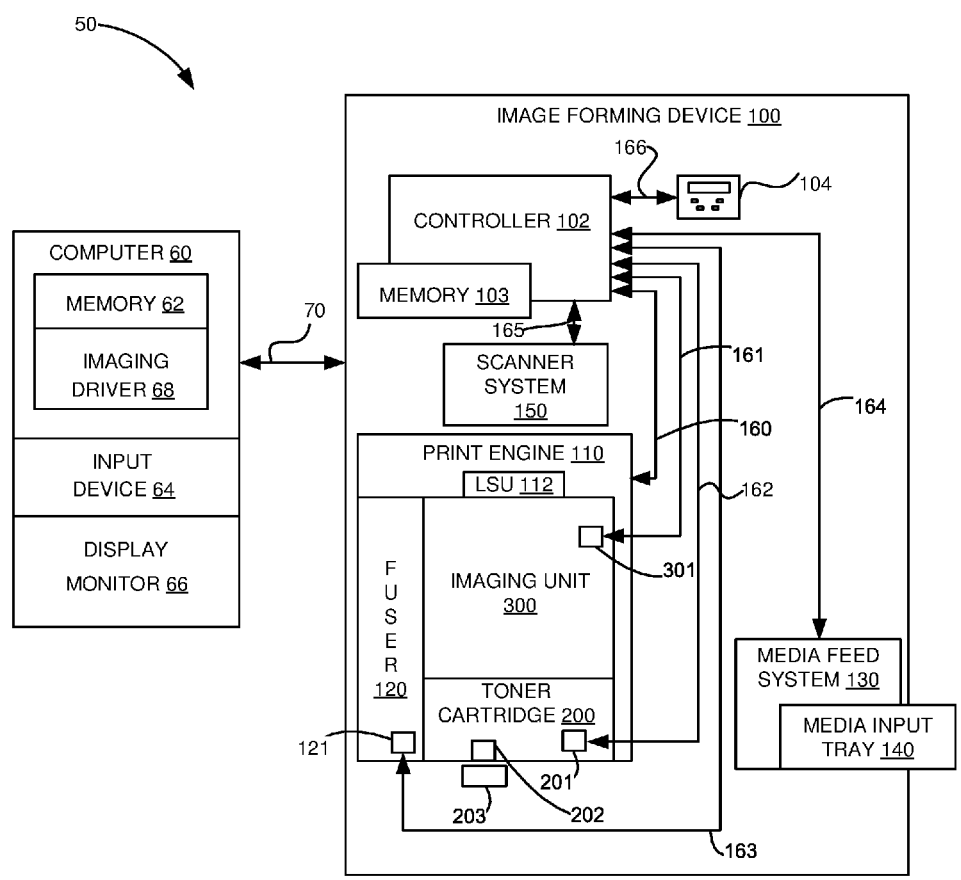
FIG. 1 is a block diagram of an imaging system including an image forming device according to one example embodiment.

Referring to the drawings and particularly to FIG. 1, there is shown a block diagram depiction of an imaging system 50 according to one example embodiment. Imaging system 50 includes an image forming device 100 and a computer 60. Image forming device 100 communicates with computer 60 via a communications link 70. As used herein, the term "communications link" generally refers to any structure that facilitates electronic communication between multiple components and may operate using wired or wireless technology and may include communications over the Internet.

In the example embodiment shown in FIG. 1, image forming device 100 is a multifunction device (sometimes referred to as an all-in-one (AIO) device) that includes a controller 102, a user interface 104, a print engine 110, a laser scan unit (LSU) 112, one or more toner bottles or cartridges 200, one or more imaging units 300, a fuser 120, a media feed system 130 and media input tray 140, and a scanner system 150. Image forming device 100 may communicate with computer 60 via a standard communication protocol, such as, for example, universal serial bus (USB), Ethernet or IEEE 802.xx. Image forming device 100 may be, for example, an electrophotographic printer/copier including an integrated scanner system 150 or a standalone electrophotographic printer. Toner bottles 200 and fusers 120 are supply items that may be user replaceable.

Controller 102 includes a processor unit and associated memory 103 and may be formed as one or more Application Specific Integrated. Circuits (ASICs). Memory 103 may be any volatile or non-volatile memory or combination thereof such as, for example, random access memory (RAM), read only memory (ROM), flash memory and/or non-volatile RAM (NVRAM). Alternatively, memory 103 may be in the form of a separate electronic memory (e.g., RAM, ROM, and/or NVRAM), a hard drive, a CD or DVD drive, or any memory device convenient for use with controller 102. Controller 102 may be, for example, a combined printer and scanner controller.

In the example embodiment illustrated, controller 102 communicates with print engine 110 via a communications link 160. Controller 102 communicates with imaging unit(s) 300 and processing circuitry 301 on each imaging unit 300 via communications link(s) 161. Controller 102 communicates with toner cartridge(s) 200 and non-volatile memory 201 on each toner cartridge 200 via communications link(s)

162. Controller 102 communicates with fuser 120 and processing circuitry 121 thereon via a communications link 163. Controller 102 communicates with media feed system 130 via a communications link 164. Controller 102 communicates with scanner system 150 via a communications link 165. User interface 104 is communicatively coupled to controller 102 via a communications link 166. Processing circuitry 121 and 301 may include a processor and associated memory such as RAM, ROM, and/or non-volatile memory and may provide authentication functions, safety and operational interlocks, operating parameters and usage information related to fuser 120, toner cartridge(s) 200 and imaging unit(s) 300, respectively. Controller 102 processes print and scan data and operates print engine 110 during printing and scanner system 150 during scanning.

Computer 60, which is optional, may be, for example, a personal computer, including memory 62, such as RAM, ROM, and/or NVRAM, an input device 64, such as a keyboard and/or a mouse, and a display monitor 66. Computer 60 also includes a processor, input/output (I/O) interfaces, and may include at least one mass data storage device, such as a hard drive, a CD-ROM and/or a DVD unit (not shown). Computer 60 may also be a device capable of communicating with image forming device 100 other than a personal computer such as, for example, a tablet computer, a smartphone, or other electronic device.

In the example embodiment illustrated, computer 60 includes in its memory a software program including program instructions that function as an imaging driver 68, e.g., printer/scanner driver software, for image forming device 100. Imaging driver 68 is in communication with controller 102 of image forming device 100 via communications link 70. Imaging driver 68 facilitates communication between image forming device 100 and computer 60. One aspect of imaging driver 68 may be, for example, to provide formatted print data to image forming device 100, and more particularly to print engine 110, to print an image. Another aspect of imaging driver 68 may be, for example, to facilitate the collection of scanned data from scanner system 150.

In some circumstances, it may be desirable to operate image forming device 100 in a standalone mode. In the standalone mode, image forming device 100 is capable of functioning without computer 60. Accordingly, all or a portion of imaging driver 68, or a similar driver, may be located in controller 102 of image forming device 100 so as to accommodate printing and/or scanning functionality when operating in the standalone mode.

Several components of the image forming device 100 are user replaceable e.g. toner cartridge 200, fuser 120, and imaging unit 300. It is advantageous to prevent counterfeiting these user replaceable components. A magnetic key 202 may be located on the toner cartridge 200 to prevent counterfeiting as described below. A magnetic field reader 203 may be integrated into the image forming device 100 to verify the authenticity of the magnetic key 202. The magnetic field reader 203 may include a magnetic field sensor attached to a linear-translation carrier to read a section of the magnetic key 202. Data related to the magnetic key 202 may reside in non-volatile memory 201.

Figure 2:
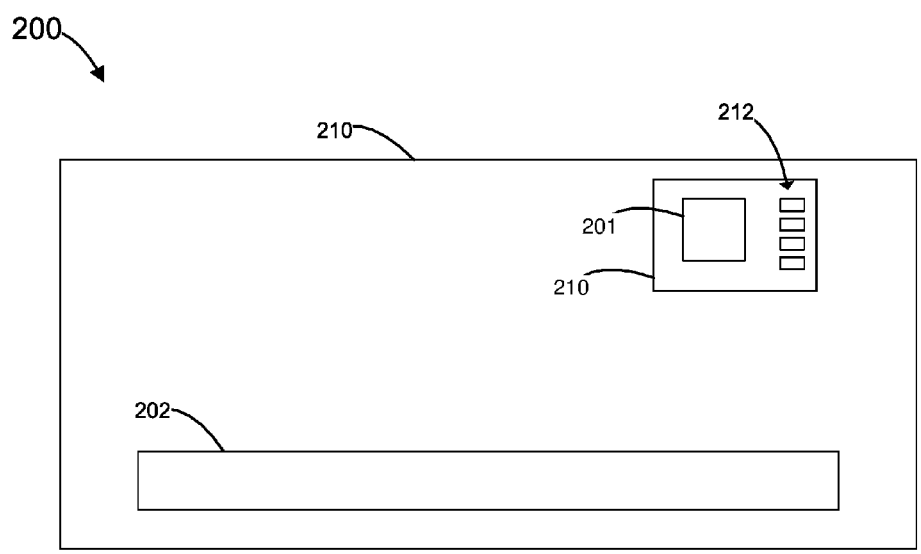
FIG. 2 is a block diagram of a toner bottle having a magnetic key.

FIG. 2 shows a side view of the toner bottle 200. The non-volatile memory 201 and magnetic key 202 are located on a body 210. The body contains toner that is consumed during the imaging process. The magnetic key 202 is elongate and contains magnetic plates as described below. The non-volatile memory 201 contains an array of numbers corresponding to the intensity of the magnetic field above a first outer surface of magnetic key 202, e.g. top surface, side surface, bottom surface, etc., at a plurality of locations along the length of the magnetic key e.g. along a linear path at evenly spaced intervals, at irregularly spaced intervals, etc. The array of numbers may also contain numbers corresponding to the intensity of the magnetic field at a second plurality of locations along a second outer surface of the magnetic key that is, for example, opposite the first surface, to make the magnetic key more difficult to counterfeit. The non-volatile memory 201 is located on a printed circuit board 210 having a row of contact pads 212 for making electrical connection to the image forming device 100.

Figure 3:
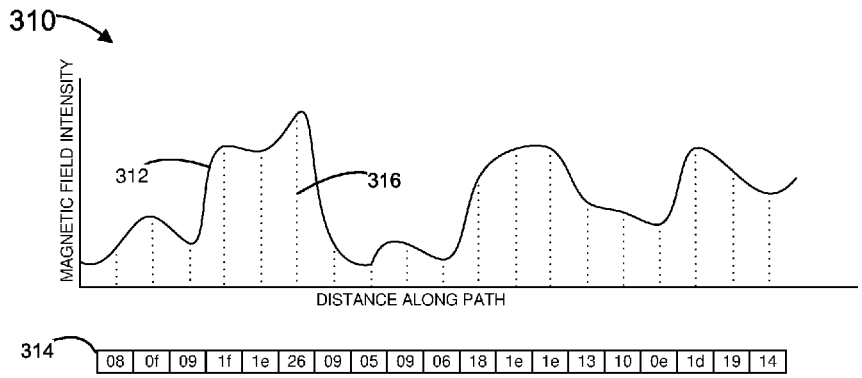
FIG. 3 is a graph of intensity of a magnetic field along an outer surface of a magnetic key.
Figure 4:
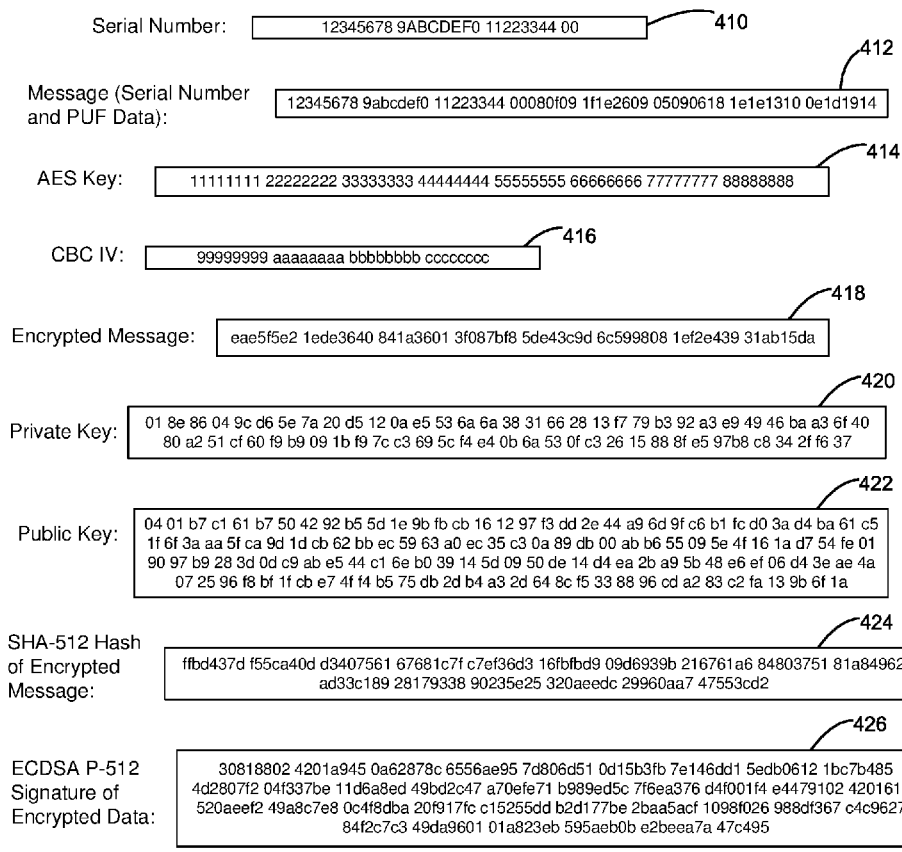
FIG. 4 is an example of generating a digital signature from an array of numbers.

FIG. 3 shows a graph 310 of the intensity 312 of an example magnetic field for one possible direction along a path along the outer surface of the magnetic key 202. An array of numbers 314 corresponds to the magnetic field intensity measured at regular intervals along the path, as shown by dotted lines 316 on the graph. Preferably, the array of numbers 314 are integers to simplify processing. Alternatively, the array of numbers may be, for example, floating point. The numbers in FIG. 3 and FIG. 4 are in hexadecimal format in this example, the magnetic field intensity is always positive. Alternatively, the magnetic field intensity may be always negative, may alternate between positive and negative, etc. Thus, the array of numbers 314 may contain positive and negative numbers. The array of numbers 314 may, for example, contain measurements of the magnetic field measured orthogonal to the outer surface. The array of numbers 314 may contain measurements of the magnetic field parallel to the outer surface. Preferably, the array of numbers contains measurements of the magnetic field along at least two orthogonal directions at each location to make it more difficult to counterfeit the magnetic key 202. Low cost magnetic field sensors are available that measure along multiple orthogonal directions, e.g. along three orthogonal directions.

FIG. 4 shows an example of generating a digital signature from the array of numbers 314. Other algorithms for generating a digital signature are known in the art. The digital signature is used by the controller 102 to verify that the magnetic-key data in the non-volatile memory is authentic. The toner bottle's serial number 410 and the array of numbers 314 are combined to form a message 412. Preferably, the message is encrypted. Alternatively, the message may be unencrypted. For this example, AES-CBC is used (see, to for example, RFC3602 "The AES-CBC Cipher Algorithm and Its Use with IPsec" published by The Internet Society (2003), and NIST (National Institute of Standards) documents FIPS-197 (for AES) and to SP800-38A (for CBC)). The AES key 414 and CBC Initialization Vector (IV) 416 are used as is known in the art to generate the encrypted message 418. In this example, to sign the encrypted message 418 first the message is hashed then the hash is encrypted with the private key 420 of an asymmetric key pair that includes a public key 422. This example uses the SHA-512 hashing algorithm and Elliptic Curve Digital Signature Algorithm (ECDSA) utilizing a P-512 curve key, as is known in the art. Other algorithms are known in the art. The SHA-512 hash 424 of the encrypted message 418 is used to generate an ECDSA P-512 digital signature 426. The signature 426 and encrypted message 418 are stored in the non-volatile memory 201. The image forming device 100 may use the array of numbers 314 in the encrypted message 418 to verify the authenticity of the magnetic key 202, and the image forming device 100 may use the digital signature 426 to verify the authenticity of the array of numbers 314. In this way, the image forming device 100 may verify the authenticity of the toner bottle 200.

Figure 5:
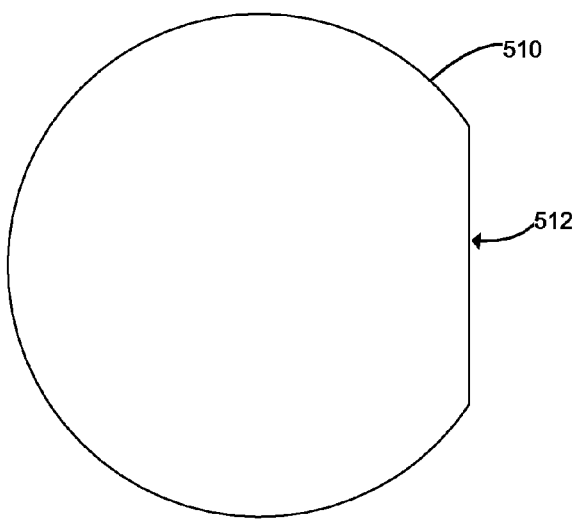
FIG. 5 is a top view of a magnetic plate.

FIG. 5 shows a top view of a magnetic plate 510. The magnetic key 202 has a plurality of magnetic plates. The magnetic plate 510 is a disk with a flat side surface 512. Alternatively, the magnetic plate top view may be other shapes including square, triangle, rectangle, arbitrary outline, etc. Preferably, the magnetic plate 510 has a longest dimension that is less than one millimeter so that tightly spaced magnetic plates generate a complicated and dense magnetic field structure that is difficult to counterfeit. Preferably, the magnetic plate 510 has a longest dimension that is more than 0.3 mm to make it easier to locate the magnetic plate using automatic pick and place equipment e.g. pick and place equipment designed for 0402 SMT components. The flat surface 512 is a feature for denoting an orientation which may be any unique shape.

Figure 6:
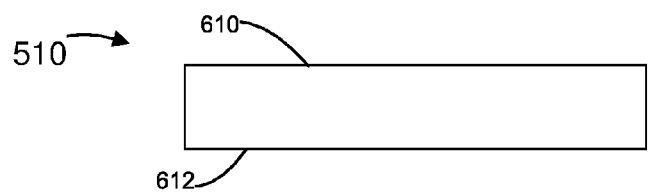
FIG. 6 is a side view of a magnetic plate.

FIG. 6. shows a side view of the magnetic plate 510. The magnetic plate 510 has a flat top surface 610 and a flat bottom surface 612. Alternatively, the magnetic plate may have a flat bottom surface 612 and a non-flat top surface. The flat bottom surface 612 is useful for uniformly arranging multiple magnetic plates on a flat substrate. The top surface 610 is parallel to the flat bottom surface 612 to make it easier to stack multiple magnetic plates.

The magnetic plate 510 contains, for example, a non-magnetic carrier and a magnetized material. An example non-magnetic carrier is a polymer. Preferably, the polymer is a dielectric polymer such as, for example, acrylic. Preferably, the magnetized material has a magnetic relative permeability less than two so that magnetic plates may be placed close to each other and the resulting magnetic field will be approximately the superposition of fields of each individual magnetic plate. An example magnetized material is neodymium-iron-boron. Other magnetized materials may be used. The non-magnetic carrier and the magnetized material may be mixed. Preferably, they would be mixed fifty percent dielectric and fifty percent neodymium-iron-boron by volume to have good mechanical strength and good magnetic field strength. Preferably, the non-magnetic carrier has a magnetic relative permeability less than four, and the magnetized material has a magnetic relative permeability less than two. Preferably, the magnetic material has a high initial relative magnetic permeability, e.g. greater than fifty, in a non-magnetized state and a low relative magnetic permeability, e.g. less than four, in a magnetized state such as, for example, Neodymium-Praseodymium-iron-Boron alloy.

Figure 7:
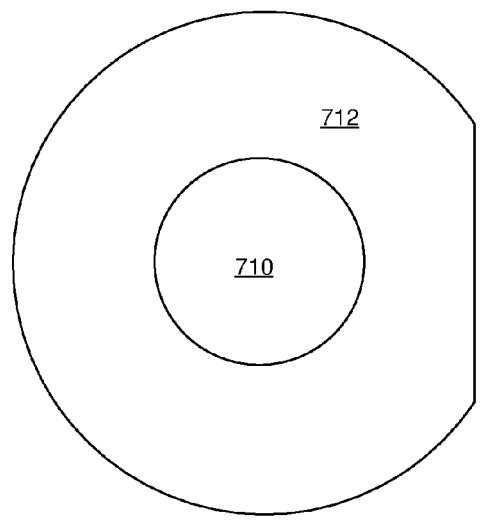
FIG. 7 is a top view of a magnetic plate.

FIG. 7 shows an alternate magnetic plate geometry that has a core 710 surrounded by a region 712 of non-magnetic carrier that surrounds the core 710 along the plane of the top surface. The core 710 may contain magnetic material or a mixture of magnetic material and non-magnetic carrier. This plate geometry may be lower cost since the amount of magnetic material is minimized. The region 712 of non-magnetic carrier protects the core 710 and makes the magnetic plate easier to pick and place. The outer shape and the core may be arbitrarily shaped.

Figure 8:
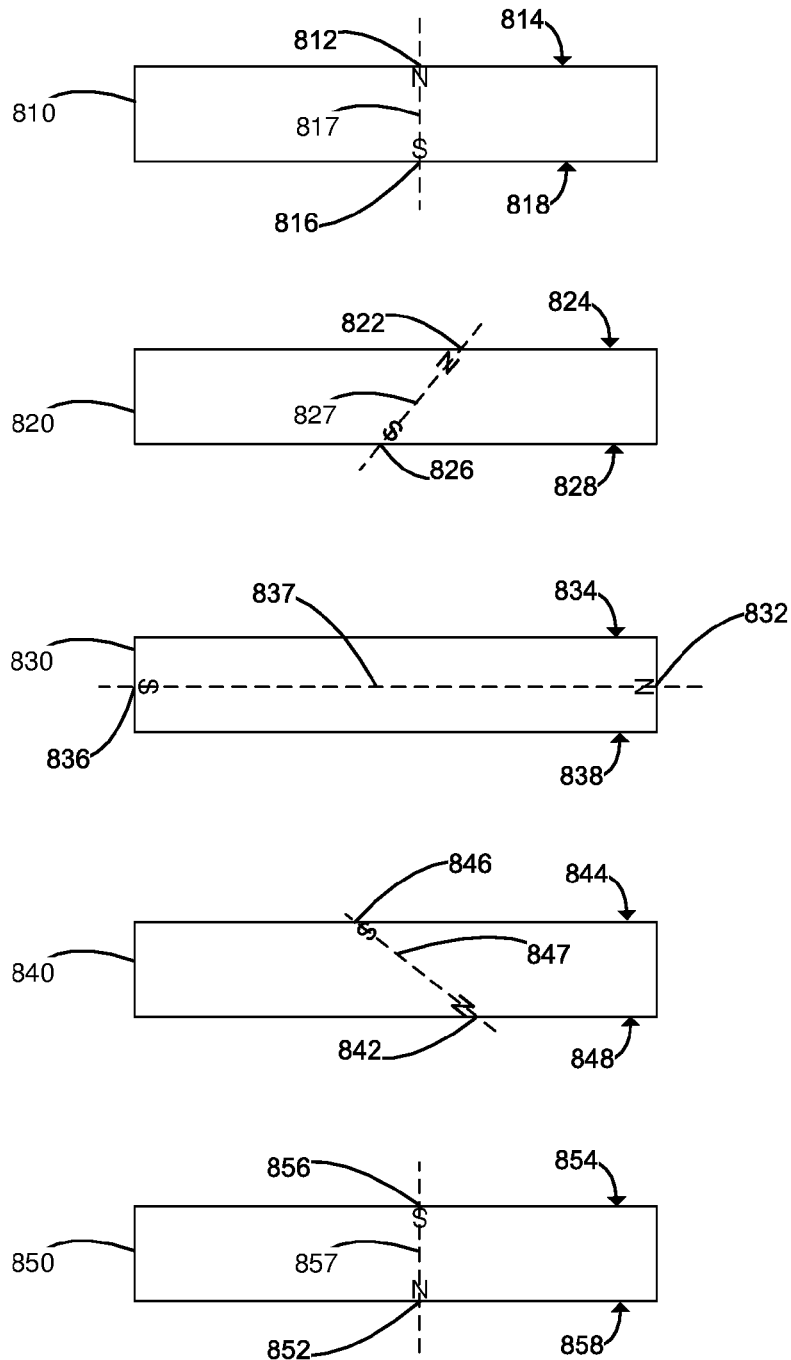
FIG. 8 is a side view of a plurality of magnetic plates.

FIG. 8 shows a side view of a plurality of magnetic plates with magnetic poles. Magnetic plate 810 has a north pole 812, i.e. the region of magnetic plate 810 from which lines of induction diverge, on its top surface 814 and a south pole 816, i.e. the region of magnetic plate 810 from which lines of induction converge, on its bottom surface 818. A straight line 817 passing through the center of north pole 812 and the center of south pole 816 is herein referred to as a magnetic pole line. The orientation of the magnetic pole line 817 is set by the orientation of the magnetic field used to magnetize the magnetic plate 810 relative to the top surface 814 and bottom surface 818 as is known in the art. The magnetic pole line 817 is orthogonal to the top surface 814.

Magnetic plate 820 has a north pole 822 on its top surface 824 and a south pole 826 on its bottom surface 828. A magnetic pole line 827 goes through the north pole 822 and the south pole 826. Magnetic pole line 827 goes through the top surface 824 at an angle, e.g. a forty-five degree angle. Magnetic plate 830 has a north pole 832, a south pole 836, and a magnetic pole line 837 that goes through the north pole 832 and the south pole 836. The magnetic pole line 837 is parallel to the top surface 824 and the bottom surface 838. Magnetic plate 840 has a north pole 842 on its bottom surface 848 and a south pole 846 on its top surface 844. A magnetic pole line 847 goes through the north pole 842 and the south pole 846, and is at an angle, e.g. a forty-five degree angle, to the bottom surface 848. Magnetic plate 850 has a north pole 852 on its bottom surface 858 and a south pole 856 on its top surface 854. A magnetic pole line 857 goes through the north pole 852 and the south pole 856 and is orthogonal to the bottom surface 858. These magnetic plates may be arranged in stacked layers. The resulting magnetic field will be approximately the superposition of each magnetic plate's magnetic field. For example, a magnetic key having a layer that alternates between magnetic plates like magnetic plate 810 and like magnetic plate 850 will have a magnetic field above a top surface of the magnetic key having an intensity that varies in polarity along the top surface. Arranging magnetic plates may create other, more complicated, magnetic fields. This example shows five magnetic pole orientations. More or fewer magnetic pole orientations may be used giving finer or coarser control of the magnetic key field, respectively. The magnetic poles may be the same strength. Alternatively, the magnetic poles may differ in strength. The superposition effect works well when the relative permeability is close to one which is the case for magnetic materials that are highly magnetized and have a high magnetic coercivity. If the material is not saturated, the permeability may be much higher than one causing the layered material to distort the magnetic field lines.

Figure 9:
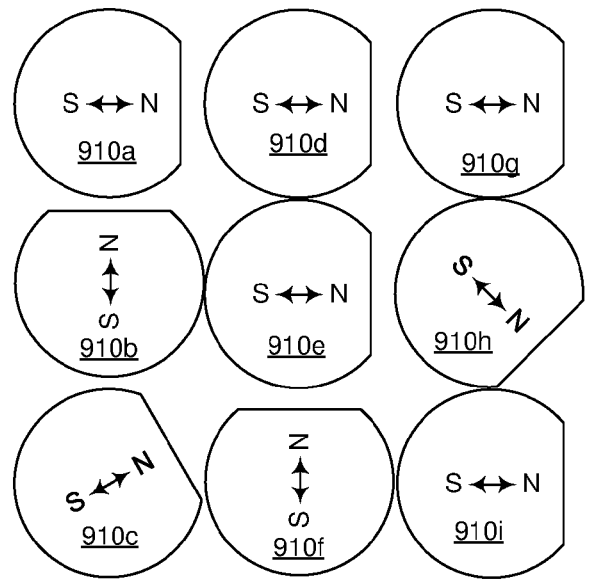
FIG. 9 is a top view of a plurality of magnetic plates.

FIG. 9 shows a top view of a plurality of magnetic plates 910a-910i. These magnetic plates may be located within a magnetic key. In this example, each magnetic plate has the same magnetic pole orientation as previously described magnetic plate 820 i.e. north pole on its top surface and magnetic pole line extending through the top surface at an angle. The magnetic plates are arranged in rows, e.g. magnetic plate 910a, 910b, and 910c are in a first row, magnetic plate 910d, 910e, and 910f are in a second row, and magnetic plate 910g, 910h, and 910i are in a third row forming a two-dimensional grid. The magnetic plates have the same shape. Some magnetic plates are rotated relative to each other, e.g. 910a is rotated ninety degrees relative to 910b. A more complicated magnetic field may be generated above the magnetic key by selectively rotating magnetic plates.

Figure 10:
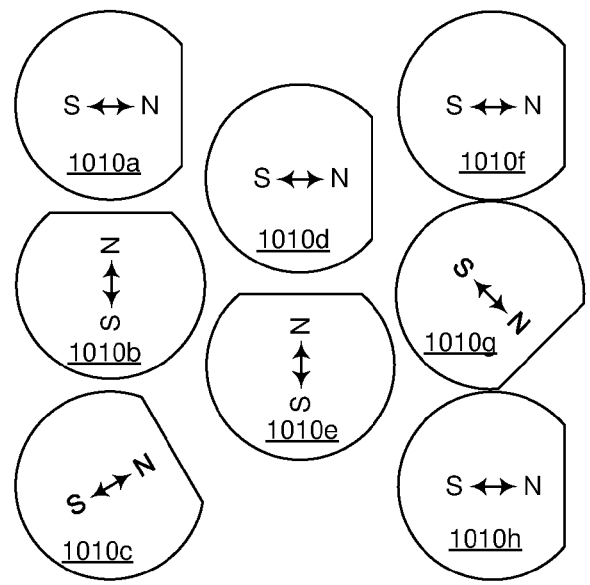
FIG. 10 is a top view of a plurality of magnetic plates.

FIG. 10 shows a top view of a plurality of magnetic plates 1010a-1010h. These plates may be located within a magnetic key. The magnetic plates are arranged in rows, e.g. magnetic plate 1010a, 1010b, and 1010c are in a first row, magnetic plate 1010d and 1010e are in a second row, and magnetic plate 1010f, 1010g, and 1010h are in a third row. The magnetic plates in the second row are offset from the magnetic plates in the first row and the second row. This offset is preferable since round magnetic plates may be more closely located and thus a stronger magnetic field may be generated. Stronger magnetic fields may be more reliably detected. The closer placed plates also allow for a more complex field pattern making it more difficult to replicate by other means.

Figure 11:
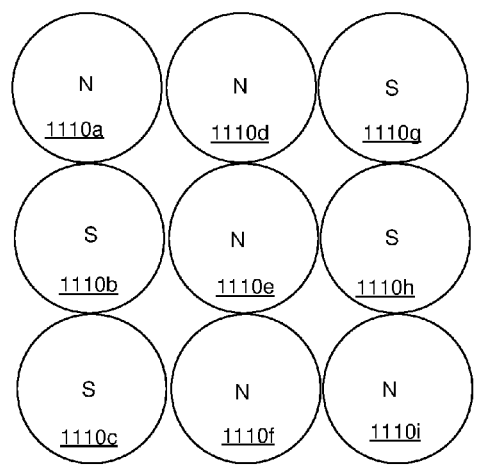
FIG. 11 is a top view of a plurality of magnetic plates.

FIG. 11 shows a top view of a plurality of magnetic plates 1110a-1110i. These plates may be located within a magnetic key. The magnetic plates are arranged in rows, e.g. magnetic plate 1110a, 1110b, and 1110c are in a first row, magnetic plate 1110d, 1110e, and 1110f are in a second row, and magnetic plate 1110g, 1110h, 1110i are in a third row. Magnetic plates 1110a, 1110d, 1110e, 1110f, and 1110i have a north pole on their top surface. Magnetic plates 1110b, 1110c, 1110g, and 1110h have a south pole on their top surface. The magnetic plates generate a magnetic field above the top surface of the magnetic key having an intensity that varies in polarity along the top surface. A low-cost magnetic field sensor may reliably detect this varying polarity.

Figure 12:
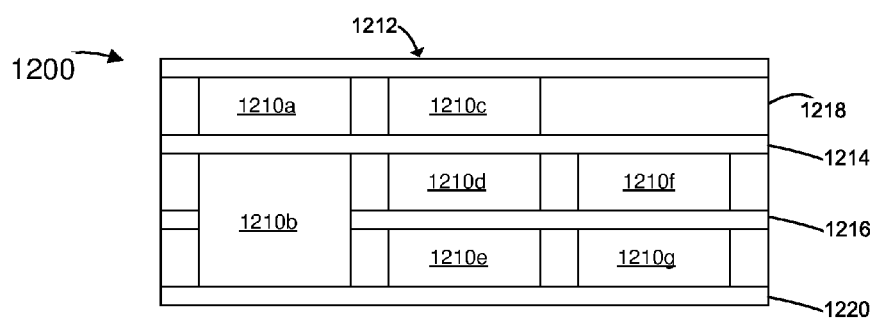
FIG. 12 is a side view of a magnetic key having a plurality of magnetic plates.

FIG. 12 shows a side view of a magnetic key 1200 having a plurality of magnetic plates 1210a-1210g. Magnetic plate 1210a and 1210c are in a first layer, magnetic plate 1210d and 1210f are in a second layer, and magnetic plate 1210e and 1210g are in a third layer. Magnetic plate 1210b is in both the second layer and the third layer, and is more than twice as thick as magnetic plate 1210d. The extra thickness may generate a stronger magnetic field. The magnetic plates are stacked in columns with the bottom surfaces of the magnetic plates in the first layer above the top surfaces of the magnetic plates in the second layer. The magnetic plates in the second layer are arranged as shown in FIG. 9. Thus, the plurality of magnetic plates contains at least three magnetic pole lines that are not parallel to each other. This results in a complicated magnetic field above an outer surface 1212 of the magnetic key having an intensity that varies along the outer surface 1212. This complicated magnetic field is difficult to counterfeit.

Layers of non-magnetic carrier 1214, 1216, may separate the magnetic plates. The layers of non-magnetic carrier may contain adhesive. Alternatively, the magnetic plates may be held in place by non-magnetic substrate material 1218 such as, for example, a UV cured epoxy. The magnetic plates may be adhered to a non-magnetic substrate 1220 such as, for example, plastic, by an adhesive.

Figure 13:
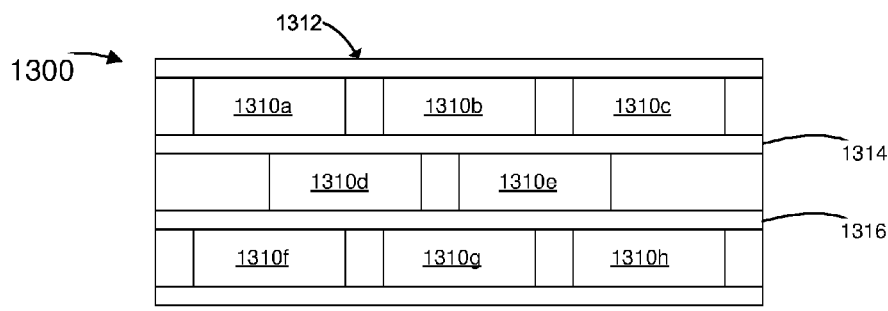
FIG. 13 is a side view of a magnetic key having a plurality of magnetic plates.

FIG. 13 shows a side view of a magnetic key having a plurality of magnetic plates 1310A-1310H. Magnetic plate 1310A, 1310B, and 1310C are in a first layer, magnetic plate 1310D and 1310E are in a second layer, and magnetic plate 1310F, 1310G, and 1310H are in a third layer. The second layer is offset from the first and second layer, resulting in a more complicated magnetic field above an outer surface 1312, which is difficult to counterfeit. The magnetic plates have flat top surfaces and flat bottom surfaces so the magnetic plates do not collide when the layers are offset. The layers may be separated by adhesive 1314, 1316.

Figure 14:
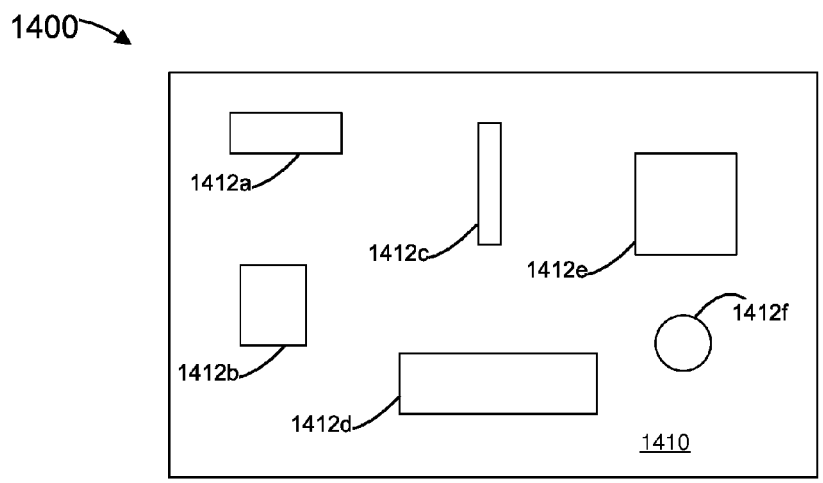
FIG. 14 is a top view of a magnet having a plurality of holes.

FIG. 14 shows a top view of a magnet 1400 having magnetic material 1410 and a plurality of holes 1412A-1412F extending through the magnet. The magnetic material 1410 may be Neodymium-Iron-Boron, a mixture of a polymer and Neodymium-Iron-Boron powder, etc. The holes may be laser ablated, die cut, etc. Laser ablation is preferred because it creates holes with well-controlled features of arbitrary shape. The magnetic material may have a uniform direction of magnetization, a spatially varying direction of magnetization such as, for example, sinusoidal, that varies in polarity along a top surface i.e. the magnetic material may have one or more north poles and south poles on its top surface. The uniform magnetization direction may be perpendicular to the top surface, parallel to the top surface, at an angle relative to the top surface, etc. The holes may contain non-magnetic material, e.g. plastic, air, etc. Preferably, the magnet layer 1400 has a neodymium-iron-boron compound with a density that is greater than three g/cm$^3$ so that the magnet layer generates a somewhat uniform magnetic field in the regions away from holes.

Figure 15:
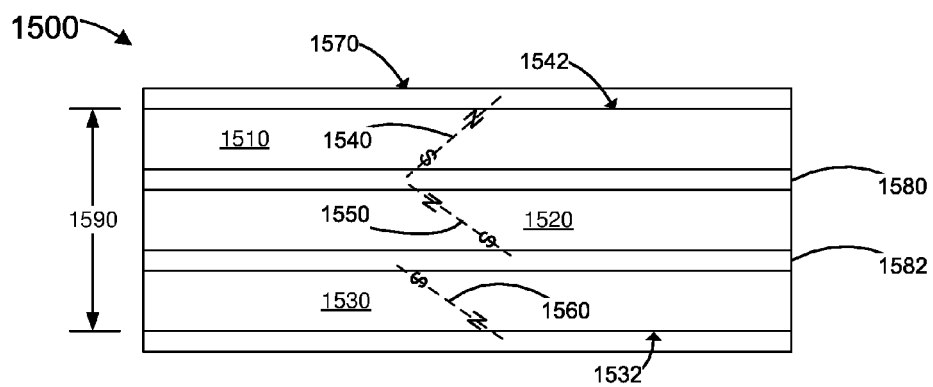
FIG. 15 is a side view of a magnetic key.

FIG. 15 shows a side view of a magnetic key 1500 having a first magnet layer 1510 stacked above a second magnet layer 1520 stacked above a third magnet layer 1530. Each layer has holes extending through the layer as shown in FIG. 14. The first magnet layer 1510 has a magnetic pole line 1540 with the north pole on its top surface 1542, the second magnet layer 1520 has a magnetic pole line 1550 that is not parallel to magnetic pole line 1540, and the third magnet layer 1530 has a magnetic pole line 1560 with the north pole on its bottom surface 1532. Magnet layer 1510 and magnet layer 1520 are opposite in polarity to magnet layer 1530 because of the locations of their north poles. The size, shape, and location of holes in the magnet layers creates a complicated magnetic field above the top surface 1570 of the magnetic key due to the superposition of the magnetic fields of each layer. The magnet layers may be separated by layers of adhesive 1580, 1582. Preferably, each magnet layer is continuous i.e. the magnet layer surrounds each hole. Preferably, the average hole area of the first magnet layer 1510 is less than one square mm, the thickness of each magnet layer is in the range of 0.1-0.5 mm, with the total thickness 1590 less than 1.5 mm.

Figure 16:
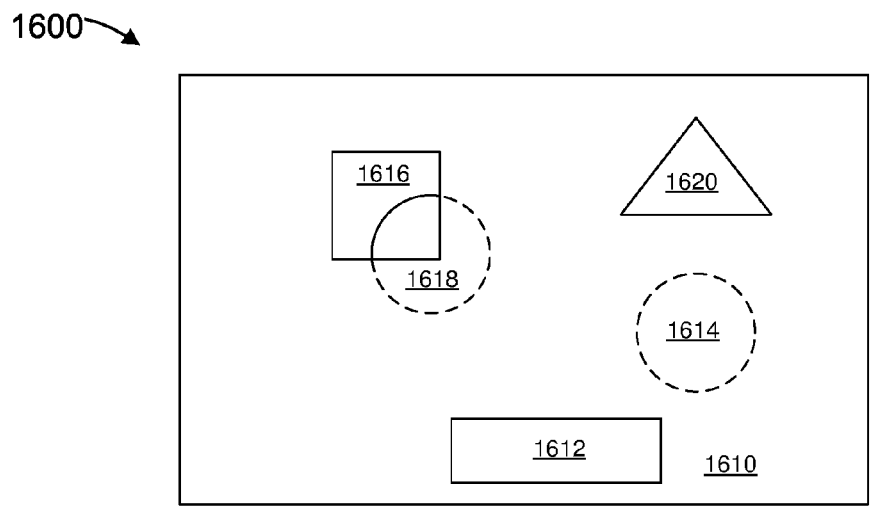
FIG. 16 is a top view of a magnetic key having a plurality of holes.

FIG. 16 shows a top view of a magnetic key 1600 having a first magnet layer 1610 stacked above a second magnet layer. The first magnet layer 1610 has a first square hole 1612 and a second square hole 1616. The second magnet layer has a first round hole 1614 and a second round hole 1618. Round hole 1614 does not overlap with any holes in the first layer and thus is shown with hidden dashed lines. Round hole 1618 partially overlaps with square hole 1616 and thus part of round hole 1618 is shown with hidden dashed lines. Triangular hole 1620 overlaps completely on both the first magnet layer 1610 and the second magnet layer. Partially overlapping holes, and holes that do not overlap, create a more complex magnetic field than magnetic keys that only have completely overlapping holes.

Figure 17:
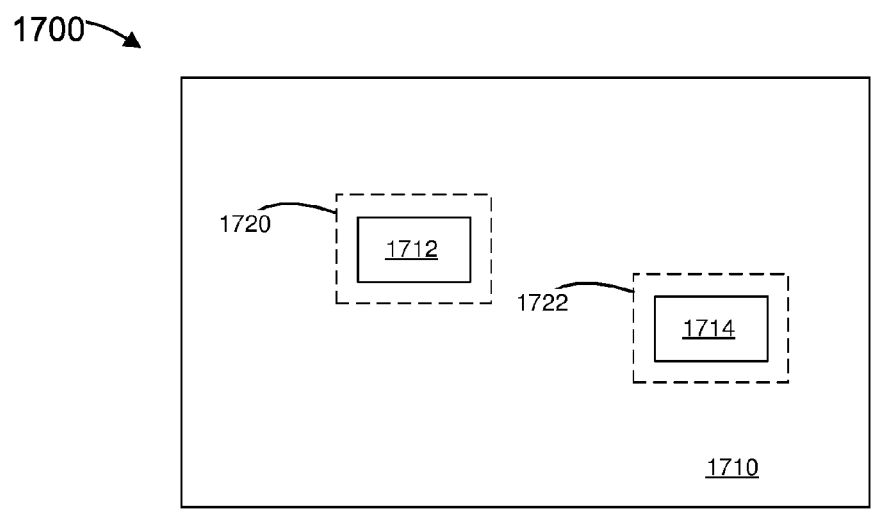
FIG. 17 is a top view of a magnetic key having a plurality of holes.

FIG. 17 shows a top view of a magnetic key 1700 having a first magnet layer 1710 stacked above a second magnet layer. The first magnet layer 1710 has a square hole 1712 and a second square hole 1714. The second magnet layer has a square hole 1720 and a second square hole 1722. The holes on the second layer are larger than the holes on the first magnet layer 1710. This is preferable, since the holes on the second layer are farther away from the top surface of the magnetic key 1700 and the magnetic field disturbances from the holes falls off with distance. For example, if the average hole area of the holes in the first magnet layer are less than one mm, and the total thickness of the magnet layers is two mm, it is preferable for the average hole area of the holes in the second magnet layer to be greater than one mm.

Figure 18:
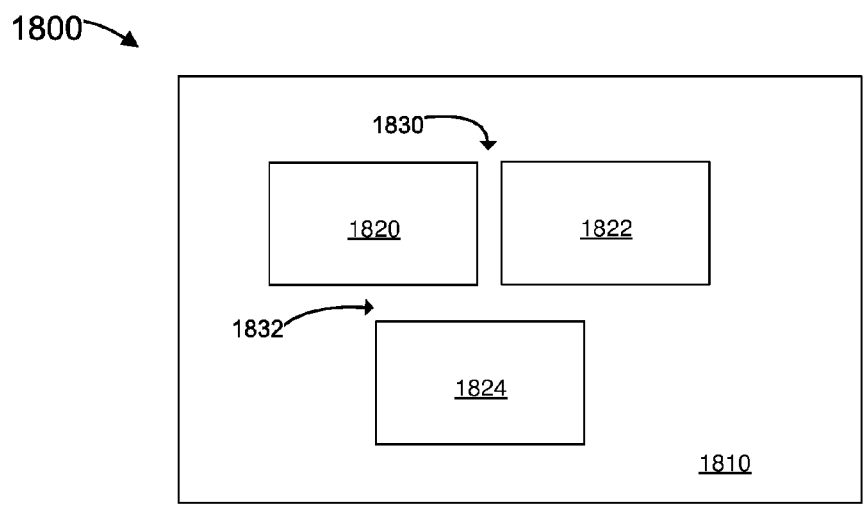
FIG. 18 is a top view of a magnetic key having a plurality of holes.

FIG. 18 shows a top view of a magnetic key 1800 having a first magnet layer 1810. Holes 1820, 1822, and 1824 are relatively larger than the strips 1830, 1832 between the holes. These strips form a lattice pattern of magnetic material between the holes. The strips generate a complicated magnetic field above the magnetic key 1800 with sharp variations over the strips. Preferably, the holes are rectangular such that the strips between the holes are rectangular to reduce variability in the magnetic field along the length of the strips so that reading the magnetic key is more tolerant to position errors of the reader. However, the holes may be non-rectangular, e.g. circular, triangular, etc., resulting in non-rectangular strips between the holes. Preferably, each strip is less than one mm at its narrowest width to generate a magnetic field that is difficult to counterfeit.

The magnetic keys have magnetic fields that are determined by the properties and placement of magnetic plates. These are well controlled, and thus the resulting magnetic fields have sufficient strength to be reliably read and sufficient complexity to be difficult to counterfeit.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed is:

1. A supply item for an imaging device comprising:
    a body;
    a magnetic key located on the body having a first magnet layer stacked above a second magnet layer, the first magnet layer has a first plurality of holes extending through the first magnet layer, the second magnet layer has a second plurality of holes extending through the second magnet layer, the first magnet layer and the second magnet layer generate a magnetic field having an intensity that varies along a top surface of the magnetic key; and
    a non-volatile memory located on the body containing an array of numbers corresponding to the intensity of the magnetic field at a first plurality of locations above the top surface of the magnetic key and also containing a digital signature generated from the array of numbers,
    wherein the first magnet layer surrounds the first plurality of holes and the second magnet layer surrounds the second plurality of holes.

2. The supply item of claim 1, wherein the first magnet layer has a top surface with a north pole on its top surface and the second magnet layer has a top surface with a south pole on its top surface.

3. The supply item of claim 1, further comprising a third magnet layer stacked below the second magnet layer, the third magnet layer has a third plurality of holes extending through the third magnet layer.

4. The supply item of claim 1, wherein some holes in the first plurality of holes do not overlap with any holes in the second plurality of holes.

5. The supply item of claim 1, wherein some holes in the first plurality of holes partially overlap with some holes in the second plurality of holes.

6. The supply item of claim 1, wherein the first magnet layer has a top surface with both a north pole and a south pole.

7. The supply item of claim 1, wherein the first plurality of holes has an average hole area that is less than one square mm.

8. The supply item of claim 7, wherein the first magnet layer has a thickness that is between 0.1 and 0.5 mm inclusive.

9. The supply item of claim 8, wherein the first magnet layer has a top surface, the second magnet layer has a bottom surface, and the distance between the first magnet layer top surface and the second magnet layer bottom surface is less than 1.5 mm.

10. The supply item of claim 1, wherein the first plurality of holes has a first average hole area, the second plurality of holes has a second average hole area, and the second average hole area is greater than the first average hole area.

11. The supply item of claim 1, wherein the first magnet layer contains a neodymium-iron-boron compound having a density greater than three $g/cm^3$.

12. The supply item of claim 1, wherein the first plurality of holes was formed by laser ablation.

13. The supply item of claim 1, wherein the magnetic key has a bottom surface opposite the top surface of the magnetic key and the array of numbers contains numbers corresponding to the intensity of the magnetic field at a second plurality of locations below the bottom surface of the magnetic key.

14. A supply item for an imaging device comprising:
    a body;
    a magnetic key located on the body having a magnet layer having a first hole and a second hole with a strip of the magnet layer separating the first hole and the second hole, the magnet layer generates a magnetic field above a top surface of the magnetic key having an intensity that varies along the top surface; and
    a non-volatile memory located on the body containing an array of numbers corresponding to the intensity of the magnetic field at a plurality of locations above the top surface and also containing a digital signature generated from the array of numbers,
    wherein the magnet layer surrounds the first hole and the second hole, and the first hole and the second hole are relatively larger than the strip of the magnet layer separating the first hole and the second hole.

15. The supply item of claim 14, wherein the strip of the magnet layer separating the first hole and the second hole is rectangular.

16. The supply item of claim 14, wherein the strip of the magnet layer separating the first hole and the second hole is less than one mm at its narrowest width.

17. The supply item of claim 14, wherein the magnet layer contains a neodymium-iron-boron compound having a density greater than three $g/cm^3$.

18. The supply item of claim 14, wherein the first hole and the second hole were formed by laser ablation.

19. A supply item for an imaging device comprising:
    a body;
    a magnetic key located on the body having a first magnet layer stacked above a second magnet layer, the first magnet layer has a first hole extending through the first magnet layer, the second magnet layer has a second hole extending through the second magnet layer, the first magnet layer and the second magnet layer generate a magnetic field above a top surface of the magnetic key having an intensity that varies along the top surface; and
    a non-volatile memory located on the body containing an array of numbers corresponding to the intensity of the magnetic field at a plurality of locations above the top surface and also containing a digital signature generated from the array of numbers,
    wherein the first hole is positioned directly above the second hole and the second hole is larger than the first hole.

20. The supply item of claim 19, wherein the first hole was formed by laser ablation.

* * * * *